United States Patent
Dore

[11] 3,778,039
[45] Dec. 11, 1973

[54] WATER INJECTION SYSTEM
[76] Inventor: Allen J. Dore, 7535 Transit Rd., East Amherst, N.Y. 14051
[22] Filed: Dec. 5, 1972
[21] Appl. No.: 312,285

[52] U.S. Cl. ............... 261/18 A, 138/44, 123/25 R
[51] Int. Cl. .......................................... F02m 25/02
[58] Field of Search ................... 261/18 A; 138/44; 123/25 R

[56] References Cited
UNITED STATES PATENTS

| | | | |
|---|---|---|---|
| 2,611,592 | 9/1952 | Anderson | 261/18 A |
| 2,624,558 | 1/1953 | Anderson | 261/18 A |
| 2,502,602 | 4/1950 | Stresen—Reuther | 138/44 X |
| 3,212,521 | 10/1965 | Jean | 138/44 |
| 1,930,614 | 10/1933 | Hall | 138/44 |
| 3,128,993 | 4/1964 | Platte et al. | 138/44 |
| 2,431,679 | 12/1947 | Adair | 261/18 A |

Primary Examiner—Tim R. Miles
Attorney—Conrad Christel et al.

[57] ABSTRACT

A system for injecting water into the boost venturi of a carburetor for ultimate introduction into the combustion chambers of a gasoline type combustion engine. The water flow is metered through an orifice in the water supply conduit at a predetermined ratio to the fuel and is injected into the constricted passage of the boost venturi at a level corresponding to the level of fuel injection.

4 Claims, 2 Drawing Figures

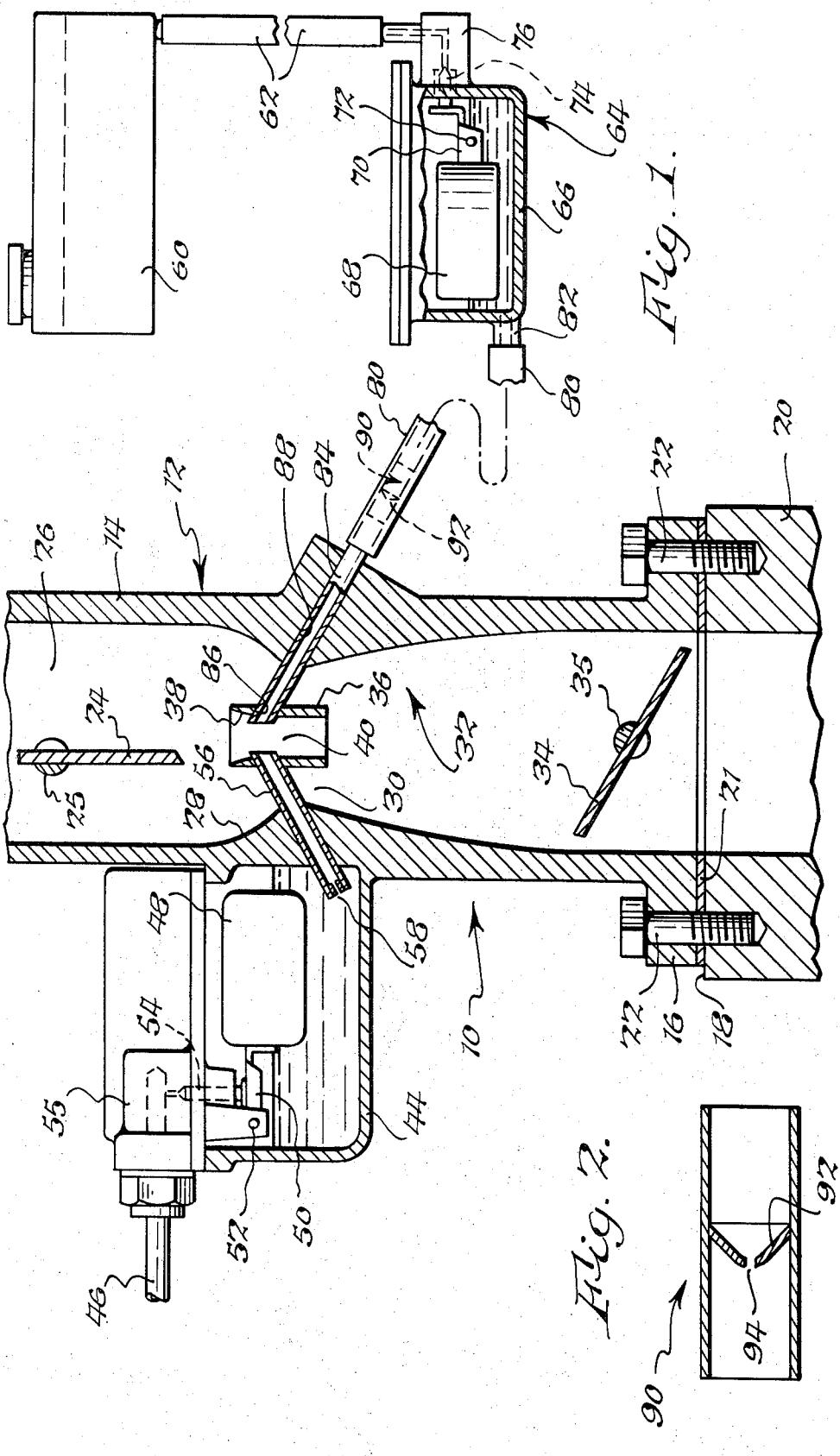

WATER INJECTION SYSTEM

BACKGROUND OF THE INVENTION

This invention relates generally to carburetors and, more particularly, to a water injection system incorporated in the carburetor of an internal combustion engine.

The discharge of exhaust gases into the atmosphere by the ever increasing number of motor vehicles in use today, especially in congested urban areas, has significantly contributed to the pollution and contamination of our atmosphere and has created environmental problems of increasing concern to the welfare of the general public. Accordingly, various regulatory agencies, including the federal government, have promulgated and/or proposed pollution abatement legislation to at least minimize contamination of our environment, such laws including limitations on the amount of motor vehicle exhaust pollutants permitted to enter into the atmosphere.

In an effort to comply with such laws and to reduce pollution from motor vehicles, many anti-pollution devices have been developed to control the exhaust emission from motor vehicles. While many of these recently developed anti-pollution devices have reduced pollution to some extent, they possess other disadvantages. For example, many of these anti-pollution devices are relatively expensive and have only a short useful life requiring expensive maintenance and replacement of parts. Moreover, the use of many of these known anti-pollution systems reduces the power output of the engine and causes a high rate of fuel consumption. Also, these systems often cause valve burning resulting in early deterioration and replacement thereof, adding to the costs of motor vehicle maintenance.

SUMMARY OF THE INVENTION

The carburetor water injection system of the present invention, as hereinafter described, obviates the above disadvantages by providing novel means for introducing water into the fuel mixture of an internal combustion engine for drastically reducing the pollutants in the exhaust emission while improving engine performance and reducing fuel consumption, the water injection system being simple in construction, low in costs, easy to install in existing engines, and which is rugged, durable and reliable in use.

The carburetor water injection system of this invention is characterized by the provision of a water supply conduit having a nozzle tapped into the carburetor boost venturi and provided with an outlet in communication with and discharging into the stream of the fuel-air mixture passing through the constricted passage of the boost venturi. A conically-shaped, disc member having an axial orifice therethrough is provided in the water supply conduit to meter the flow of water into the venturi passage at an optimum rate to effect retardation of combustion in the engine and the elimination of objectionable detonation to reduce pollution in the exhaust gases and virtually eliminate carbon deposits on the various engine components.

BRIEF DESCRIPTION OF THE DRAWING FIGURES

FIG. 1 is a cross-sectional view, with parts removed and others shown in elevation, of a water injection system of this invention used in conjunction with a carburetor of a combustion engine; and FIG. 2 is a longitudinal sectional view, on an enlarged scale, of an orifice member used in conjunction with this invention.

DETAILED DESCRIPTION OF AN ILLUSTRATIVE EMBODIMENT

Referring now in detail to the illustrative embodiment depicted in the drawings, there is shown in FIG. 1 a carburetor, generally designated 10, comprising an elongated, vertically extending casing 12 having an upper end or horn 14 to which is attached the usual air filter (not shown). The lower end of casing 12 terminates in an outwardly extending annular flange 16 adapted to mate with a complementary surface 18 formed at the upper end of an intake manifold 20. A fluid-tight gasket 21 is interposed between flange 16 and surface 18, the casing 12 being rigidly secured to intake manifold 20 by suitable fasteners, such as bolts 22. The terms upper, lower, upwardly, downwardly and the like as used herein, are applied only for convenience of description with reference to FIG. 1, and are not used in a limiting sense.

A choke valve 24, mounted on a rotatable shaft 25, is suitably mounted in the upper end or horn 14 of casing 12 by any suitable means (not shown) in a conventional manner for manual or automatic operation under certain temperature conditions to vary the air flow therethrough as is well known in the art. Casing 12 defines a passage 26 through which the air flows for admixture with the fuel. Casing 12 is provided with an intermediate section having an increased wall thickness provided with a smoothly tapering inner wall surface 28 defining a constricted passage 30 to form the conventional main venturi, generally designated 32, for the purpose of providing a zone of increased velocity and decreased pressure in the usual manner. A throttle valve 34, mounted on a rotatable shaft 35, is mounted at the lower end of casing 12 between main venturi 32 and intake manifold 20 for controlling or metering the amount of the fuel-air mixture admitted to the intake manifold 20 and untimately to the engine.

A boost venturi 36, having a smoothly tapering inner wall surface 38 defining a smaller constricted passage 40, is mounted within constricted passage 30 of the main venturi 32. Boost venturi 36 can be supported in place by various support arrangements, such as by means of the fuel nozzle, or by radially extending webs, or by a mounting bracket located within casing 12. In any event, boost venturi 36 is mounted substantially concentrically with main venturi 32 and provides a zone of greater velocity and lesser pressure than that provided by constriction 30 of main venturi 32.

The fuel feeding means includes a fuel "bowl" or receptacle 44, formed integral with casing 12 and connected by means of a conduit 46 and a suitable fuel pump (not shown) to a suitable source of fuel, such as gasoline for example, also not shown. Liquid fuel is maintained at a substantially constant elevation in bowl 44 by means of a float 48 having a bracket 50 affixed thereto. Bracket 50 is mounted for pivotal movement about a pin 52 and carries a needle valve 54 movable in a housing 55 for engagement against its seat to interrupt the admission of fuel into bowl 44 when the fuel in such bowl 44 reaches a predetermined level.

A fuel nozzle 56 is mounted in the wall of main venturi 32 and extends from bowl 44 through and into boost venturi 36. An orifice 58 is provided in the inlet end of nozzle 56, which is in communication with the liquid fuel in bowl 44. The discharge or outlet end of nozzle 56 is located within constricted passage 40.

During operation of the engine, air flowing downwardly through passage 26 is forced to flow through constricted passage 40 of boost venturi 36 at an increased velocity and consequent reduction in pressure to withdraw fuel from bowl 44 through nozzle 56 into passage 40 for admixture with the air flowing therethrough and subsequent introduction into the engine via intake manifold 20 in a manner well known in the art. The total amount of fuel and air fed to the engine, which determines the speed and output of the engine, is controlled by throttle valve 34. When valve 34 is entirely opened, the engine runs at its maximum speed and power output, the speed and power output decreasing as throttle valve 34 is activated toward a closed position.

It should be understood that the carburetor construction hereinabove described is conventional and typical of the general type of carburetor construction with which the instant invention is concerned. In practice, the carburetor can vary widely in details of construction without departing from the spirit of the present invention.

In accordance with this invention, means are provided for injecting water or water vapor into the fuel intake at a controlled rate. Such means include a water supply reservoir or tank 60 suitably mounted in the engine compartment of a motor vehicle. Tank 60 preferably is formed of a durable plastic material and has a capacity of from approximately one-half to three gallons of water. Tank 60 supplies water through a conduit 62 to a flow control apparatus, generally designated 64, comprising a water bowl or receptacle 66 having a float 68 therein. A bracket 70 is welded or otherwise fixedly secured to float 68. Bracket 70 is mounted for pivotal movement about a pin 72 for actuating and depressing a needle valve plunger 74 in a valve housing 76 against its seat to interrupt the flow of water into receptacle 66 when the water therein reaches a predetermined level. Thus, water is maintained at a substantially constant level in receptacle 66.

A flexible conduit 80 is slip fitted at one end thereof over the end of an outlet fitting 82 provided at the lower end of receptacle 66. Conduit 80 preferably is formed of a flexible, transparent plastic material. However, conduit 80 can be formed of any other suitable flexible tubing, as desired. The other end of conduit 80 is fitted over one end of a water injection nozzle 84 mounted in the wall of main venturi 32 and projecting into boost venturi 36. Nozzle 84 preferably is fitted into aligned bores 86 and 88 drilled into the boost and main venturi walls, respectively, and adhesively secured in place therein. The outlet end of water injection nozzle 84 is located within constricted passage 40 of boost venturi 36 at substantially the same level as the outlet of fuel nozzle 56.

A tubular insert 90 is mounted within conduit 80 with a friction fit and is provided with an integral, conically shaped disc member 92 having a central orifice 94 therein for metering the flow of water to nozzle 84. The size of orifice 94 determines the flow of water into the fuel intake and can vary, as dictated by the specific requirements of the engine with which the system is associated. It has been found that a preferred fuel-water ratio in most gasoline-type combustion engines is forty to one, i.e., 40 parts fuel to one part water. However, the ratio can vary, as desired or dictated by the specific engine requirements, within the purview of this invention.

The concavity of the conically-shaped disc member 92 is important in reducing turbulence adjacent orifice 94 and assisting in the smooth flow of water therethrough. Also, the concavity of disc member 92 serves to eliminate the build up or accumulation of particles adjacent the small sized orifice 94 to prevent clogging thereof. For optimum results, orifice 94 should be located within about 3 inches from carburetor casing 12.

All the components of the water injection system of the invention, including nozzle 84, conduit 80, insert 90 and disc member 92 preferably are formed of a durable plastic material to resist corrosion and oxidation. Also, these components are relatively small to conserve space. For example, conduit 80 can have a 5/32 inch diameter with insert 90 having a 5/32 inch outside diameter and a disc wall thickness of 0.02 inches. The inherent resiliency of the plastic material of conduit 80 will yield and stretch, enabling insert 90 to be forcibly inserted therein and thereafter held in place by friction. The above dimensions are exemplary only, it being understood that they may vary as dictated by the specific application.

The mode of operation is as follows:

Upon starting the engine, the air passing downardly through constricted passage 40 of boost venturi 36 at an increased velocity and reduced pressure is effective to withdraw water from receptacle 66 through conduit 80, orifice 94 and nozzle 84. The water is atomized and injected into passage 40 along with the fuel-air mixture for ultimate introduction into the engine conbustion chambers via intake manifold 20, the amount of water entering the combustion chambers being controlled by throttle valve 34 and proportioned to the fuel by means of orifice 94.

A significant feature of this invention is introducing the water into the constricted passage 40 of boost venturi 36, preferably at approximately the same level as the fuel is injected thereinto, in order to obtain optimum atomization or vaporization of the water. Introducing the water at other levels or locations above or below passage 40 adversely affects proper water atomization due to the turbulence generated adjacent opposite ends of boost venturi 36 and main venturi 32.

The water does not react or intermix with the fuel in the combustion chambers, but is effective to retard combustion by causing the fuel to burn at a lower rate of speed. Moreover, the water tends to cool the engine, prolonging the useful life thereof and enabling the timing to be advanced significantly for additional power and reduced fuel consumption without attendant preignition or undesirable detonation. It has been found that the timing can be advanced as much as 12° beyond factory specifications without adverse detonation.

A significant advantage residing in the water injection system of this invention is that the gases evolved during combustion and which form the exhaust emission discharged into the atmosphere contain only slight or tolerable amounts of noxious pollutants. Also, the water tends to maintain the engine clean and eliminates carbon deposits on the various engine components such as the valves, spark plugs, ignition points, etc. to prolong the useful life thereof and drastically reduce maintenance costs. When the system is installed in used engines, it is effective to positively remove pre-existing carbon deposits from the various engine components.

The water injection system of the present invention was installed in a high performance engine of a 1967 Pontiac passenger vehicle having approximately 65,000 miles of usage. At the time the system was installed, the engine was noticeably sluggish. After approximately 8,000 miles of operation, tests were conducted to determine the exhaust emission level and the general condition of the engine. One such test is designed to determine the hydrocarbon and carbon monoxide content in the exhaust gases through a standard infrared exhaust gas analysis. The results of the tests were as follows:

| RPM | HYDROCARBONS | CARBON MONOXIDE IN PERCENTAGES |
|---|---|---|
| 2500 | 200 PPM | 1.2 |
| 1000 | 300 PPM | 1.1 |

Exhaust emission levels of up to 400 PPM hydrocarbons and 3 percent carbon monoxide content are considered safe under the standards prescribed by the above test. The results of the above tests indicate that the water injection system of this invention is effective to materially reduce the noxious contaminants or pollutants in motor vehicle exhaust emissions well below tolerable levels. Moreover, it was found that the performance of the engine improved considerably without repairs or alterations during the 8,000 miles operation with the use of less expensive, low-lead fuels during this period. Furthermore, the engine was noticeably cleaner and there was no indication of any carbon deposits on any of the engine components, resulting in a longer useful life of the exhaust system, spark plugs, ignition points, condenser, wires and coil.

As a result of this invention, a simple and inexpensive water injection system, incorporated in the carburetor of a motor vehicle combustion engine, is provided for drastically reducing the amount of harmful pollutants contained in the exhaust gases of motor vehicles while improving engine performance. This system is effective in cooling the engine and virtually eliminates carbon deposits otherwise commonly found on the various components of a conventional engine to minimize component repair and replacement and prolong the useful life of such components, thus appreciably reducing maintenance costs. Also, the cheaper, low octane rated-low lead fuels can be utilized, even in high-ratio compression engines, without consequent detonation or "knocking" to realize low fuel consumption and further reduce costs.

The water injection system of the present invention can be readily installed in the engine compartment of new motor vehicles and/or the components forming the system can be provided in a relatively compact and inexpensive kit form for easy installation in used or existing motor vehicles. The system is operative for the life of the motor vehicle with little or no service except for adding water to tank 60. Should the water be completely consumed or otherwise exhausted and not replenished in the system through either inadvertance or neglect, the engine will not be damaged in any way and will perform in a conventional manner.

A preferred embodiment of this invention having been disclosed in detail, it is to be understood that this has been done by way of illustration only.

I claim:

1. A system for injecting water into a carburetor having a main venturi and a secondary venturi positioned within the main venturi and a fuel nozzle having an outlet communicating with the restricted passage of said secondary venturi comprising: a tank for containing water, a water nozzle mounted in said secondary venturi and having an outlet in communication with said restricted passage at substantially the level of said fuel nozzle outlet, conduit means connecting said tank to said water nozzle for supplying water thereto, said conduit means having an orifice for metering the rate of water flow therethrough and into said nozzle, control means in said conduit means for controlling the flow of water to said water nozzle, an insert mounted in said conduit means downstream of said control means, said insert comprising an elongated tubular body and a conically shaped disc extending transversely of said body and formed integral therewith, said disc being located approximately centrally of said tubular body and inclined rearwardly in the direction of water flow, said disc having a central opening defining said orifice, said water nozzle, said insert and said conduit means being formed of a corrision resistant plastic material.

2. In a carburetor comprising a casing having an elongated passage, a portion of said passage having a restricted throat portion defining a first venturi, a boost venturi mounted within said restricted throat portion and defining a restricted passage for the flow of air therethrough, a fuel nozzle projecting into said restricted passage and having an outlet for introducing fuel thereinto, the improvement comprising: means for injecting water into said carburetor, said water injecting means comprising a water nozzle projecting into said restricted passage and having an outlet in communication with said restricted passage at substantially the same level as said fuel nozzle outlet, a tank for containing water, conduit means connecting said tank to said water nozzle, an insert mounted in said conduit means, said insert comprising a tubular body and a conically shaped disc extending transversely of said body and inclined rearwardly in the direction of water flow, said disc being located substantially centrally of said tubular body and formed integral therewith, and said disc having a central opening therein defining an orifice for metering the rate of water flow introduced into said restricted passage of said boost venturi.

3. A carburetor according to claim 2 including means in said conduit means for controlling the flow of water to said water nozzle, said control means interrupting the flow of water to said water nozzle upon the termination of air flow through said restricted passage.

4. A carburetor according to claim 2 wherein said water nozzle, said conduit means and said insert is formed of a plastic material.

* * * * *